United States Patent
Huf et al.

(10) Patent No.: US 11,498,512 B2
(45) Date of Patent: Nov. 15, 2022

(54) AIRBAG ASSEMBLY FOR A VEHICLE SEAT OF A MOTOR VEHICLE

(71) Applicant: Bayerische Motoren Werke Aktiengesellschaft, Munich (DE)

(72) Inventors: Andreas Huf, Neusaess (DE); Sylvia Kleindl, Munich (DE); Fabian Koehler, Valley (DE); Robert Martin, Munich (DE); Adam McNeill, White Plains, NY (US); Martin Unger, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 16/845,254

(22) Filed: Apr. 10, 2020

(65) Prior Publication Data
US 2020/0238944 A1 Jul. 30, 2020

Related U.S. Application Data

(63) Continuation of application No. PCT/EP2018/075252, filed on Sep. 18, 2018.

(30) Foreign Application Priority Data

Oct. 13, 2017 (DE) ...................... 10 2017 218 338.1

(51) Int. Cl.
*B60R 21/2338* (2011.01)
*B60R 21/207* (2006.01)
(Continued)

(52) U.S. Cl.
CPC ........ *B60R 21/2338* (2013.01); *B60R 21/207* (2013.01); *B60R 21/2165* (2013.01);
(Continued)

(58) Field of Classification Search
CPC .............. B60R 21/2338; B60R 21/207; B60R 21/23138; B60R 2021/23146;
(Continued)

(56) References Cited

U.S. PATENT DOCUMENTS 5,806,923 A * 9/1998 Tschaschke .......... B60N 2/4249
297/216.13
6,142,511 A 11/2000 Lewis
(Continued)

FOREIGN PATENT DOCUMENTS

CN 102470818 A 5/2012
CN 103538549 A 1/2014
(Continued)

OTHER PUBLICATIONS

International Search Report (PCT/ISA/210) issued in PCT Application No. PCT/EP2018/075252 dated Nov. 22, 2018 with English translation (six pages).
(Continued)

*Primary Examiner* — James A English
*Assistant Examiner* — Joselynn Y Sliteris
(74) *Attorney, Agent, or Firm* — Crowell & Moring LLP

(57) ABSTRACT

A vehicle seat of a motor vehicle has a side airbag provided on the vehicle seat, and a tension band assembly which includes a first tension band and a second tension band. The first tension band has an upper end and a lower end. The upper end of the first tension band is fixed in the region of the upper end of the backrest of the vehicle seat while the lower end is arranged in the region of the seat surface of the vehicle seat. The second tension band has an upper end and a lower end. The upper end of the second tension band is fixed in the region of the head support on the vehicle seat while the lower end is rigidly connected to the first tension band below the upper end of the first tension band. The
(Continued)

tension band assembly is rigidly connected to the side airbag.

12 Claims, 2 Drawing Sheets

(51) Int. Cl.
  *B60R 21/231*  (2011.01)
  *B60R 21/00*  (2006.01)
  *B60R 21/2165*  (2011.01)

(52) U.S. Cl.
  CPC .................. *B60R 21/23138* (2013.01); *B60R 2021/0048* (2013.01); *B60R 2021/0058* (2013.01); *B60R 2021/23146* (2013.01); *B60R 2021/23382* (2013.01); *B60R 2021/23386* (2013.01)

(58) Field of Classification Search
  CPC .... B60R 2021/0048; B60R 2021/0058; B60R 2021/23382; B60R 2021/23386
  See application file for complete search history.

(56) References Cited

U.S. PATENT DOCUMENTS

| | | | | |
|---|---|---|---|---|
| 8,899,619 | B2* | 12/2014 | Fukawatase | B60R 21/207 |
| | | | | 280/730.2 |
| 9,193,326 | B2* | 11/2015 | Fukawatase | B60R 21/0136 |
| 9,238,425 | B2* | 1/2016 | Fukawatase | B60N 2/4235 |
| 10,328,889 | B2 | 6/2019 | Sugie et al. | |
| 10,625,704 | B2* | 4/2020 | Dry | B60N 2/14 |
| 10,864,878 | B2* | 12/2020 | Nagasawa | B60R 21/207 |
| 11,066,036 | B2* | 7/2021 | Gwon | B60N 2/64 |
| 11,285,904 | B2* | 3/2022 | Jung | B60R 21/2338 |
| 2012/0126518 | A1 | 5/2012 | Fukawatase | |
| 2014/0015233 | A1 | 1/2014 | Fukawatase | |
| 2014/0062069 | A1 | 3/2014 | Fukawatase | |
| 2014/0300088 | A1 | 10/2014 | Fukawatase | |
| 2016/0264091 | A1 | 9/2016 | Fujiwara | |
| 2017/0057459 | A1 | 3/2017 | Kondo et al. | |
| 2018/0178748 | A1 | 6/2018 | Zhang et al. | |
| 2020/0406855 | A1* | 12/2020 | Saito | B60R 21/2338 |
| 2021/0031717 | A1* | 2/2021 | Fuma | B60R 21/2338 |
| 2021/0370861 | A1* | 12/2021 | Matsushita | B60R 21/01554 |
| 2022/0089118 | A1* | 3/2022 | Schneider | B60R 21/233 |
| 2022/0097644 | A1* | 3/2022 | Jaradi | B60R 21/2165 |

FOREIGN PATENT DOCUMENTS

| | | |
|---|---|---|
| CN | 103661230 A | 3/2014 |
| CN | 104039603 A | 9/2014 |
| CN | 105517852 A | 4/2016 |
| CN | 106314350 A | 1/2017 |
| CN | 106476748 A | 3/2017 |
| DE | 197 38 728 A1 | 3/1999 |
| DE | 199 13 360 A1 | 9/2000 |
| DE | 100 32 106 A1 | 1/2002 |
| DE | 102 58 245 A1 | 6/2004 |
| JP | 2008-213614 A | 9/2008 |
| JP | 2009-29182 A | 2/2009 |
| JP | 2010-83384 A | 4/2010 |
| JP | 2017-185923 A | 10/2017 |

OTHER PUBLICATIONS

German-language Written Opinion (PCT/ISA/237) issued in PCT Application No. PCT/EP2018/075252 dated Nov. 22, 2018 (five pages).

German-language Search Report issued in German Application No. 10 2017 218 338.1 dated Apr. 6, 2018 with partial English translation (16 pages).

English-language of Chinese Office Action issued in Chinese Application No. 201880060385.7 dated Sep. 27, 2021 (four (4) pages).

* cited by examiner

AIRBAG ASSEMBLY FOR A VEHICLE SEAT OF A MOTOR VEHICLE

CROSS REFERENCE TO RELATED APPLICATIONS

This application is a continuation of PCT International Application No. PCT/EP2018/075252, filed Sep. 18, 2018, which claims priority under 35 U.S.C. § 119 from German Patent Application No. 10 2017 218 338.1, filed Oct. 13, 2017, the entire disclosures of which are herein expressly incorporated by reference.

BACKGROUND AND SUMMARY OF THE INVENTION

The present invention relates to an airbag assembly for a vehicle seat of a motor vehicle.

Airbags are occupant-restraint systems designed to enhance the passive safety of motor vehicles and prevent an occupant from colliding against hard parts of the interior, such as the steering wheel or instrument panel. Vehicles today are equipped with a large number of airbags, wherein only certain ones are triggered depending on the deceleration of the vehicle and on the angle of collision (frontal airbag, head airbag, side airbag, knee airbag, etc.).

With autonomous vehicles having undergone numerous developments, it is possible for the vehicle architecture to be fundamentally altered. This includes the free configuration of the passenger seats in the interior. The arrangement of the seats transversely with respect to the direction of travel is recommended on the basis of the advantages that this affords in terms of ergonomics and communication. However, passive safety systems such as airbags are designed for vehicles with the direction of the seats parallel to the direction of travel. In the event of a frontal collision, a frontal airbag does not then provide protection, but instead only a system that laterally supports the body.

It is of particular importance to support the head, so that the latter does not strike against hard elements in the interior. One way of enhancing passive safety is to provide airbags that are integrated in the seat belts. For seats that are installed in the direction of travel, there are designs for inflatable seat belts, of the kind disclosed in U.S. Pat. No. 6,142,511 and DE 199 13 360 A1, for example.

However, airbag systems for enhancing passive safety are designed for vehicles with a seat direction parallel to the direction of travel and are not suitable for other seat directions since, in the event of a frontal collision, with seats installed transversely, very considerable lateral forces act on the body, which forces cannot be adequately absorbed by the known airbag systems.

From DE 197 38 728 A1, it is known to fit a support band on side airbags. The support band extends from the front of the seat cushion to just below the center of the backrest. However, the effect achieved by this is not considered to be sufficient.

The object of the present invention is to provide an airbag assembly for a vehicle seat of a motor vehicle, which airbag assembly is able to improve the passive safety of an occupant present on this vehicle seat in the event of a collision, in particular in the event of a side impact with a "normally" installed vehicle seat, and in the event of a frontal collision for a vehicle seat installed transversely with respect to the direction of travel.

This object is achieved by an airbag assembly, a vehicle seat, and a motor vehicle in accordance with the claimed invention.

Terms such as "upward", "downward", "left" and "right" are used hereinafter to describe or define the spatial localization of the airbag assembly according to the invention in a motor vehicle. These terms relate to the customary spatial orientation of a motor vehicle and of its vehicle seats on a level surface and are not to be interpreted as restrictive, in the sense that an airbag assembly separate from a vehicle or from a vehicle seat can also be spatially arranged in a different way.

According to the invention, an airbag assembly for a vehicle seat of a motor vehicle comprises a side airbag provided laterally on the vehicle seat in order to stabilize at least the shoulder and the head of an occupant, present on the vehicle seat, by inflation of the side airbag, and a tension band assembly, which comprises a first tension band and a second tension band. The first tension band has an upper end and a lower end, and its upper end is fixed in the region of the upper end of the backrest of the vehicle seat, while the lower end is arranged in the region of the seat surface of the vehicle seat. The second tension band has an upper end and a lower end, and its upper end is fixed in the region of the headrest on the vehicle seat, while the lower end is rigidly connected to the first tension band below the upper end of the first tension band. The tension band assembly is configured, and rigidly connected to the side airbag, in such a way that the side airbag, when triggered, maintains its shape necessary for the stabilization, despite being impacted by the head and the shoulder of the occupant. In this way, the passive safety for the occupant present on the vehicle seat is greatly improved, particularly in the event of a side impact with a vehicle seat installed in the direction of travel, and in the event of a frontal impact with a vehicle seat installed transversely with respect to the direction of travel.

The invention thus relates to a side airbag assembly which can be used both for seats installed in the direction of travel and for seats installed transversely with respect to the direction of travel, and which serves respectively to enhance the passive safety in the event of a side impact or in the event of a frontal collision. The airbag assembly is in this case installed in the backrest, the headrest and the seat surface of the vehicle seat and deploys to a large volume when triggered.

The side airbag is formed for example from a plastic bag, according to current practice, and deploys by means of a gas generator within 20-50 milliseconds. To prevent lateral folding-away under the effect of a force, a lateral tension band assembly stretches tight between the front end of the seat surface and the upper end of the backrest and the headrest during the deployment process. This tension band assembly stretches tight over the shoulders and the head of the occupant and is integrated in the side airbag or fitted on the outside of the latter.

If the tension band assembly is located inside the side airbag and is thus rigidly connected to the side airbag on the inner side of the side airbag, the overall stability of the system comprising the tension band assembly and the side airbag can thus be improved.

In an advantageous case, the tension band assembly and the side airbag are arranged inside a seat lining of the backrest in the region of a tear seam which can tear open upon inflation of the side airbag in order to fully release the tension band assembly and the side airbag. Therefore, the tension band assembly and the side airbag do not get in the way during the normal use of a motor vehicle equipped with them, but they are ready for use in the event of a collision, as is the case with a conventional side airbag.

According to an advantageous development of the invention, the tension band assembly and the side airbag, in the inflated state of the side airbag, are designed to at least partially enclose the head and also to support the head in a direction parallel to the plane of extent of the backrest. In this way, the head is supported in the direction parallel to the plane of the backrest.

If the tension band assembly and the side airbag in the inflated state cover the shoulders, or at least part thereof, and also at least part of the upper body, this gives as large as possible a bearing surface, with corresponding reduction of the pressure exerted on the body parts in question in the event of a collision, said pressure being built up by the abrupt acceleration forces that occur in an accident.

In an advantageous embodiment of the airbag assembly according to the invention, the lower end of the first tension band is fixed laterally to the seat surface in the region of the front end of the seat surface. In this way, in the event of a collision, the side airbag is supported and held or stabilized by the tension band assembly over a very large surface area and can thus optimally deliver its effect.

The aforementioned advantages can be accordingly extended if the vehicle seat is provided with a tension band assembly and a side airbag on both transverse sides. In other words, both sides of the vehicle seat equipped according to the invention are thus protected or supported, and the head, shoulders and pelvis are enclosed on both sides, in contrast to traditional airbag systems.

According to a further advantageous embodiment, the vehicle seat is provided with a tension band assembly and a side airbag on both transverse sides, and the two lower ends of the first tension band are arranged in the region of the front end of the seat surface and are connected to each other by a connecting band which is arranged inside a seat surface lining in the region of a tear seam which can tear open upon inflation of the side airbag in order to fully release the connecting band, wherein the assembly is configured such that the two lower ends of the first tension band are pulled upward together with the connecting band when the side airbag is inflated. Since, in this arrangement, the two lower ends of the respective first tension bands and the connecting band connecting them are not fixed but instead mounted movably, these lower ends in the event of a collision are pulled upward with the connecting band by the tensile forces which act on them on account of the stretching of the side airbag, and the connecting band thus moves the legs of the occupant upward, for example in the region just above the back of the knees, as a result of which it is possible to avoid a situation where, particularly in the event of a frontal impact, there is a danger of the occupant slipping down through the lap belt.

The aforementioned object is also achieved by a vehicle seat and by a motor vehicle according to the invention. These also result in the same or similar advantages as those described above, for which reason, in order to avoid repetition, reference is made to the above observations made in connection with the device according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
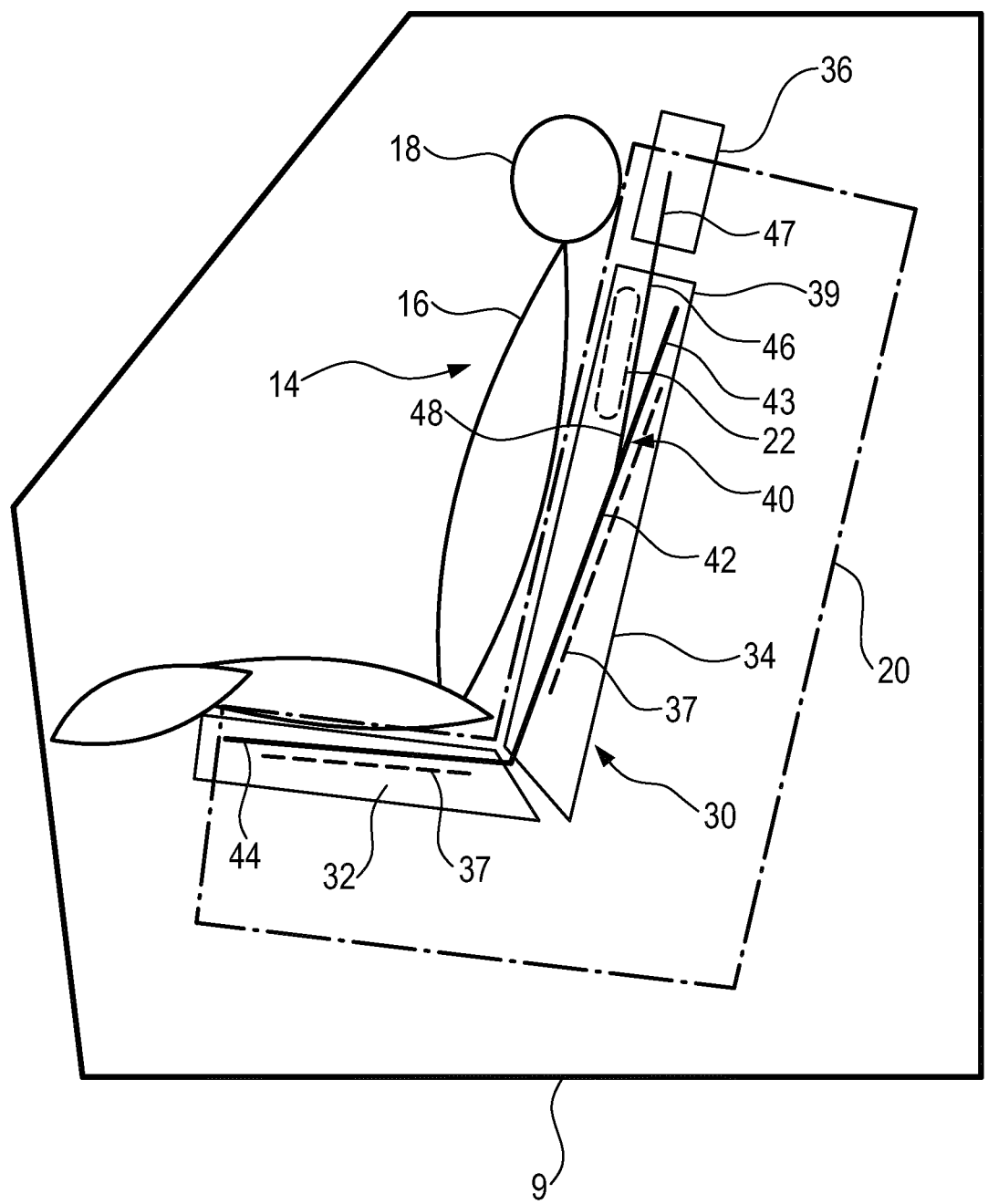
FIG. 1 is a side view of a first embodiment of an airbag assembly according to the invention for an installed vehicle seat of a motor vehicle, in a situation before the side airbag is triggered.

A first embodiment of an airbag assembly 20 for a vehicle seat 30 of a motor vehicle 9 is shown schematically in FIG. 1. Here, the reference signs for the individual components of the airbag assembly 20 are enclosed by a dot-and-dash line.

According to the view in FIG. 1, an occupant 14 is sitting on a vehicle seat 30 of a motor vehicle 9. A side airbag 22 is provided laterally on each side of the vehicle seat 30 in order to stabilize at least the shoulder 16 and the head 18 of the occupant 14 by inflation of the side airbag 22. The view of FIG. 1 shows the side airbag 22 uninflated and arranged in its usual position. It will be appreciated that only the side airbag 22 located to the left of the vehicle seat 30 is shown here, along with the corresponding tension band assembly 40, while the corresponding components located to the right of the vehicle seat 30 are not depicted in the drawing.

A tension band assembly 40 with a first tension band 42 and a second tension band 46 is also provided laterally on the vehicle seat 30. To be more precise, the first tension band 42 has an upper end 43 and a lower end 44, and its upper end 43 is secured in the region of the upper end 39 of the backrest 34 of the vehicle seat 30, and its lower end 44 is secured in the region of the seat surface 32, for example at the front end thereof. Moreover, the second tension band 46 has an upper end 47 and a lower end 48, and its upper end 47 is rigidly connected in the region of the headrest 36, and its lower end is rigidly connected to the first tension band 42 below the upper end 43 of the first tension band 42.

The tension band assembly 40 is configured, and rigidly connected to the side airbag 22, in such a way that the side airbag 22, when triggered, maintains its shape necessary for the stabilization, although it is subjected to high forces by the head 18 and the shoulder 16 of the occupant 14. It is thus possible to effectively avoid a situation where the side airbag folds away laterally and cannot sufficiently provide its restraining and supporting function. As is shown in FIG. 1, a tear seam 37 (indicated only partially and schematically) that is able to tear open is provided in the seat lining of the backrest 34, through which tear seam 37 the tension band assembly 40 can emerge from the seat lining in the event of the side airbag 22 being triggered.

Figure 2:
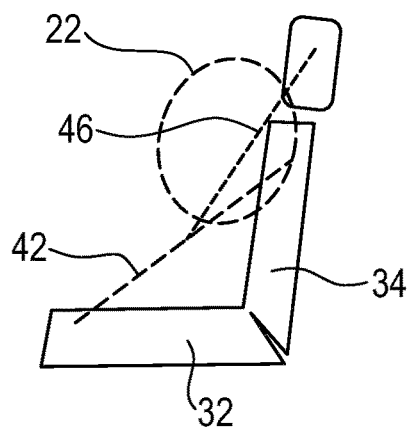
FIG. 2 is a view, comparable to FIG. 1, of the first embodiment after the side airbag has been triggered and therefore after the tension band assembly has been stretched tight.
Figure 3:
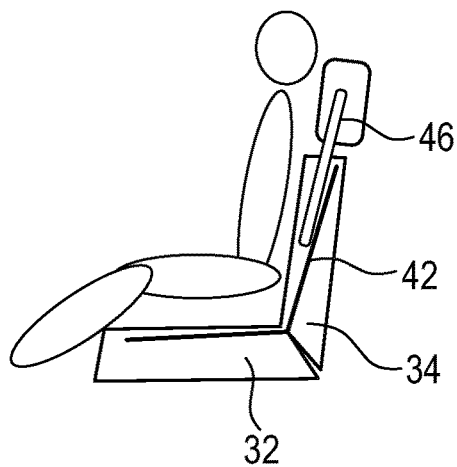
FIG. 3 is a side view of a second embodiment of the airbag assembly according to the invention, in a situation before the side airbag is triggered.
Figure 4:
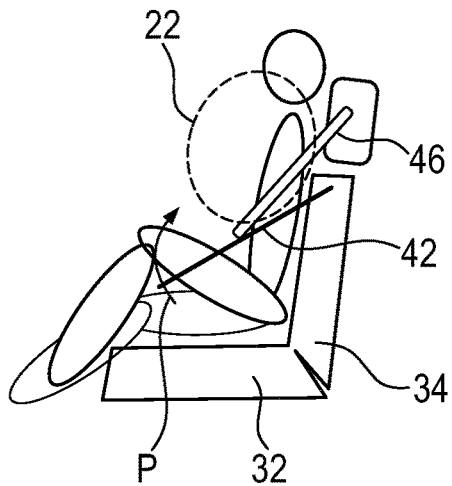
FIG. 4 is a view, comparable to FIG. 3, after the side airbag has been triggered and therefore after the tension band assembly has been stretched tight.

FIG. 2 shows the first embodiment, without the occupant 14, in a situation in which the side airbag 22 has inflated and the tension band assembly 40 has "deployed". As can be seen from FIG. 2, the tension band assembly 40 with the first tension band 42 and the second tension band 46 offers, in the deployed state, a large support surface for the deployed side airbag 22 and thus leads to very good stabilization of the side airbag 22.

FIGS. 3 to 6 show schematic views of a second embodiment of an airbag assembly 20 for a vehicle seat 30. This second embodiment differs from the first embodiment, shown in FIGS. 1 and 2, in that the two lower ends 44 of the first tension band 42 are not secured on the seat surface 32 but instead are arranged only in a seat lining of the backrest 34 and connected to each other by a connecting band 49. The lower ends 44 and the connecting band 49 are located here in the region of a tear-open tear seam 31 (cf. FIG. 5) through which the lower ends 44 and the connecting band 49 can be torn out of the lining 33 when the side airbag 22 is triggered or inflated.

The particular aspect of the second embodiment is that, when the side airbag 22 is triggered and the tension band assembly 40 deployed, the lower ends 44 of the first tension band 42 and also the connecting band 49 connecting them are pulled upward and in so doing also pull the legs of the occupant 14 upward, for example in the region above the knees, as is indicated by an arrow. It is thereby possible to prevent a situation in which, particularly in the case of a frontal collision, the occupant 14 slips forward under his lap belt (not shown here) and thus loses the protective function of the safety belts and of possible further airbags.

Figure 5:
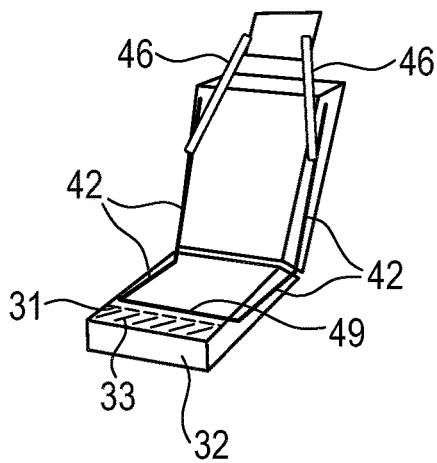
FIG. 5 is a perspective view of the spatial arrangement of the tension band assembly of the second embodiment before the side airbag is triggered.
Figure 6:
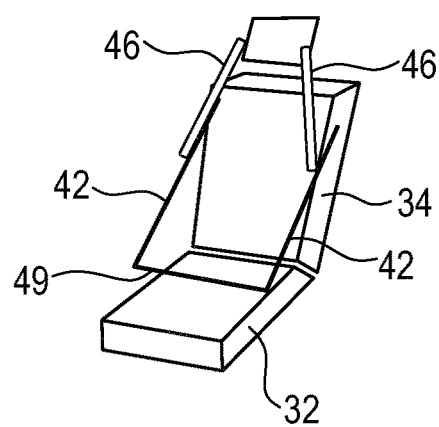
FIG. 6 is a perspective view of the spatial arrangement of the tension band assembly of the second embodiment after the side airbag has been triggered.

The arrangement of the tension band assembly 40 before and after triggering of the side airbag 22 can be seen in the perspective views in FIGS. 5 and 6, respectively.

The inflation of the side airbag 22 can take place in a known way, for example as described in the aforementioned patent documents.

Since the tension bands enclose the shoulders and the airbag encloses most of the passenger, the airbag assembly according to the invention in some cases affords such a high degree of restraint that a safety belt may no longer be necessary or, instead of a three-point belt, only a two-point belt or lap belt need be provided.

It will be noted that the features of the invention that have been described with reference to individual embodiments or variants, for example the nature and configuration of the individual tension bands and of the side airbag, etc., and their spatial arrangement, may also be present in varied form in other embodiments, unless stated otherwise or prohibited for technical reasons. Moreover, of the features of individual embodiments that have been described in combination, not all of the features necessarily have to be realized in a particular embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An airbag assembly for a vehicle seat of a motor vehicle, comprising:
   a side airbag provided laterally on the vehicle seat and configured to stabilize at least a shoulder and a head of an occupant, present on the vehicle seat, by inflation of the side airbag; and
   a tension band assembly, which comprises a first tension band and a second tension band, wherein
   the first tension band has an upper end and a lower end, and the upper end is fixed in a region of an upper end of a backrest of the vehicle seat, while the lower end is arranged in a region of a seat surface of the vehicle seat, and
   the second tension band has an upper end and a lower end, and the upper end is fixed in a region of a headrest on the vehicle seat, while the lower end is rigidly connected to the first tension band below the upper end of the first tension band;
   wherein the tension band assembly is configured, and rigidly connected to the side airbag, such that the side airbag, when triggered, maintains a shape necessary for stabilization, despite being impacted by the head and the shoulder of the occupant.

2. The airbag assembly according to claim 1, wherein the tension band assembly is located inside the side airbag.

3. The airbag assembly according to claim 1, wherein the tension band assembly and the side airbag are arranged inside a seat lining of the backrest in a region of a tear seam which tears open upon inflation of the side airbag in order to fully release the tension band assembly and the side airbag.

4. The airbag assembly according to claim 1, wherein the tension band assembly and the side airbag, in an inflated state of the side airbag, are configured to at least partially enclose the head and also to support the head in a direction parallel to a plane of extent of the backrest.

5. The airbag assembly according to claim 4, wherein the tension band assembly and the side airbag, in the inflated state of the side airbag, are configured to cover at least part of the shoulder and of an upper body of the occupant.

6. The airbag assembly according to claim 1, wherein the tension band assembly and the side airbag, in an inflated state of the side airbag, are configured to cover at least part of the shoulder and of an upper body of the occupant.

7. The airbag assembly according to claim 1, wherein the lower end of the first tension band is fixed laterally to the seat surface in a region of a front end of the seat surface.

8. The airbag assembly according to claim 1, wherein each transverse side of the vehicle seat is provided with the tension band assembly and the side airbag.

9. The airbag assembly according to claim 1, wherein each transverse side of the vehicle seat is provided with the tension band assembly and the side airbag,
   the two lower ends of the first tension bands are arranged in a region of a front end of the seat surface and are connected to each other by a connecting band which is arranged inside a seat surface lining in a region of a tear seam which tears open upon inflation of the side airbags in order to fully release the connecting band, and
   the assembly is configured such that the two lower ends of the first tension bands are pulled upward together with the connecting band when the side airbags are inflated.

10. A vehicle seat comprising an airbag assembly according to claim 9.

11. A vehicle seat comprising an airbag assembly according to claim 1.

12. A motor vehicle comprising a vehicle seat according to claim 11.

* * * * *